US008068050B2

(12) United States Patent
Christianson

(10) Patent No.: US 8,068,050 B2
(45) Date of Patent: Nov. 29, 2011

(54) METHODS AND SYSTEMS FOR DETECTION OF HAZARD TO AVIATION DUE TO CONVECTIVE WEATHER

(75) Inventor: Paul Christianson, Seattle, WA (US)

(73) Assignee: Honeywell International Inc., Morristown, NJ (US)

( * ) Notice: Subject to any disclaimer, the term of this patent is extended or adjusted under 35 U.S.C. 154(b) by 18 days.

(21) Appl. No.: 12/640,976

(22) Filed: Dec. 17, 2009

(65) Prior Publication Data

US 2011/0148692 A1     Jun. 23, 2011

(51) Int. Cl.
*G01C 23/00* (2006.01)
*G06F 19/00* (2011.01)
*G01S 13/00* (2006.01)

(52) U.S. Cl. .................. 342/26 B; 342/26 R; 342/26 A; 342/26 C; 342/26 D; 701/3; 701/14

(58) Field of Classification Search ................. 342/26 R, 342/26 A, 26 B, 26 C, 26 D; 701/3, 14
See application file for complete search history.

(56) References Cited

U.S. PATENT DOCUMENTS

| | | | | | |
|---|---|---|---|---|---|
| 5,198,819 | A | * | 3/1993 | Susnjara | 342/26 B |
| 5,265,024 | A | * | 11/1993 | Crabill et al. | 701/200 |
| 5,488,375 | A | * | 1/1996 | Michie | 342/26 B |
| 5,945,926 | A | * | 8/1999 | Ammar et al. | 340/970 |
| 6,384,830 | B2 | * | 5/2002 | Baron et al. | 345/473 |
| 6,563,452 | B1 | * | 5/2003 | Zheng et al. | 342/26 R |
| 6,865,452 | B2 | * | 3/2005 | Burdon | 701/3 |
| 6,879,280 | B1 | * | 4/2005 | Bull et al. | 342/26 B |
| 6,882,302 | B1 | * | 4/2005 | Woodell et al. | 342/26 R |
| 6,917,860 | B1 | * | 7/2005 | Robinson et al. | 701/3 |
| 7,081,834 | B2 | * | 7/2006 | Ruokangas et al. | 340/945 |
| 7,109,913 | B1 | * | 9/2006 | Paramore et al. | 342/26 B |
| 7,205,928 | B1 | * | 4/2007 | Sweet | 342/26 B |
| 7,307,576 | B1 | * | 12/2007 | Koenigs | 342/26 R |
| 7,307,577 | B1 | * | 12/2007 | Kronfeld et al. | 342/26 B |
| 7,352,317 | B1 | * | 4/2008 | Finley et al. | 342/26 B |
| 7,411,541 | B2 | * | 8/2008 | Khatwa | 342/26 R |

(Continued)

OTHER PUBLICATIONS

Kelley, et al; Convective towers in eyewalls of tropical cyclones observed by the TRMM precipitation radar in 1998-2001; TRMM Science Data and Information System, NASA Goddard, Greenbelt, Maryland; Center for Earth Observation and Space Research, George Mason University, Fairfax, Virginia.

Greene et al.; Vertically Integrated Liquid Water a New Analysis Tool, Monthly Weather Review, Washington, D.C., US, vol. 100, No. 7, Jul. 1, 1972, pp. 548-552 XP007917709, ISSN: 0027-0644, p. 549, 550.

(Continued)

*Primary Examiner* — Thomas Tarcza
*Assistant Examiner* — Peter Bythrow
(74) *Attorney, Agent, or Firm* — Lowe Graham Jones PLLC

(57) ABSTRACT

Systems and methods for improving output of weather information. A weather radar system receives weather reflectivity values. A processing device stores the received weather reflectivity values into a three-dimensional buffer, calculates a sum of the reflectivity value stored in a column of cells within the three-dimensional buffer, and assigns a first hazard indication to the cells of the column when the result of the calculation is above a first threshold. A display device generates a weather display based on data stored in the three-dimensional buffer. The weather display includes a display icon associated with the hazard indication when a cell from the three-dimensional buffer has been selected for the weather display.

17 Claims, 3 Drawing Sheets

U.S. PATENT DOCUMENTS

| | | | |
|---|---|---|---|
| 7,467,031 B2* | 12/2008 | King | 701/4 |
| 7,471,995 B1* | 12/2008 | Robinson | 701/3 |
| 7,474,250 B2* | 1/2009 | Makkapati et al. | 342/26 R |
| 7,486,220 B1* | 2/2009 | Kronfeld et al. | 342/26 B |
| 7,528,765 B1* | 5/2009 | Woodell et al. | 342/26 B |
| 7,656,343 B1* | 2/2010 | Hagen et al. | 342/26 B |
| 7,705,769 B2* | 4/2010 | Kelly et al. | 342/26 R |
| 7,714,767 B1* | 5/2010 | Kronfeld et al. | 342/26 B |
| 2006/0145912 A1* | 7/2006 | Makkapati et al. | 342/26 R |
| 2007/0005249 A1* | 1/2007 | Dupree et al. | 702/3 |
| 2007/0236383 A1* | 10/2007 | Makkapati et al. | 342/26 R |
| 2007/0285283 A1* | 12/2007 | Bitar et al. | 340/963 |
| 2008/0158048 A1* | 7/2008 | Ridenour et al. | 342/26 B |
| 2008/0165051 A1* | 7/2008 | Khatwa | 342/26 B |
| 2009/0177343 A1 | 7/2009 | Bunch et al. | |

OTHER PUBLICATIONS

Rockwell Collins; Collins WXR-2100 Multiuscan Radar Fully Automatic Weather Radar, Internet Citation, Jan. 1, 2003, p. 1OPP, XP007917548, Retrieved from the Internet: URL: http://www.baron58.com/downloads/weather%radar%20white%20paper.pdf [retrieved on Jan. 1, 2003 *the whole document*.

* cited by examiner

METHODS AND SYSTEMS FOR DETECTION OF HAZARD TO AVIATION DUE TO CONVECTIVE WEATHER

BACKGROUND OF THE INVENTION

Airborne weather radars are used to identify convective weather that generates turbulence that can be hazardous to aviation. The detection is typically based only on radar reflectivity of the weather that exists at a selected part of a storm. The degree of hazard is assumed to be related to this reflectivity. However, this is not always a valid assumption to make.

SUMMARY OF THE INVENTION

An assessment of whether a convective weather cell is a hazard is more properly made by an evaluation of the amount of vertical development of the cell. The greater the vertical extent and amount of precipitation maintained aloft, the greater is the vertical air velocity, which then produces turbulence that is hazardous to aviation. Therefore, to improve the assessment of the degree of hazard resulting from convective weather, there is a need to include the amount of vertical development of convection.

The present invention provides systems and methods for improving output of weather information. A weather radar system receives weather reflectivity values. A processing device stores the received weather reflectivity values into a three-dimensional buffer, calculates a sum of the reflectivity value stored in a column of cells within the three-dimensional buffer, and assigns a first hazard indication to the cells of the column when the result of the calculation is above a first threshold. A display device generates a weather display based on data stored in the three-dimensional buffer. The weather display includes a display icon associated with the hazard indication when a cell from the three-dimensional buffer has been selected for the weather display.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
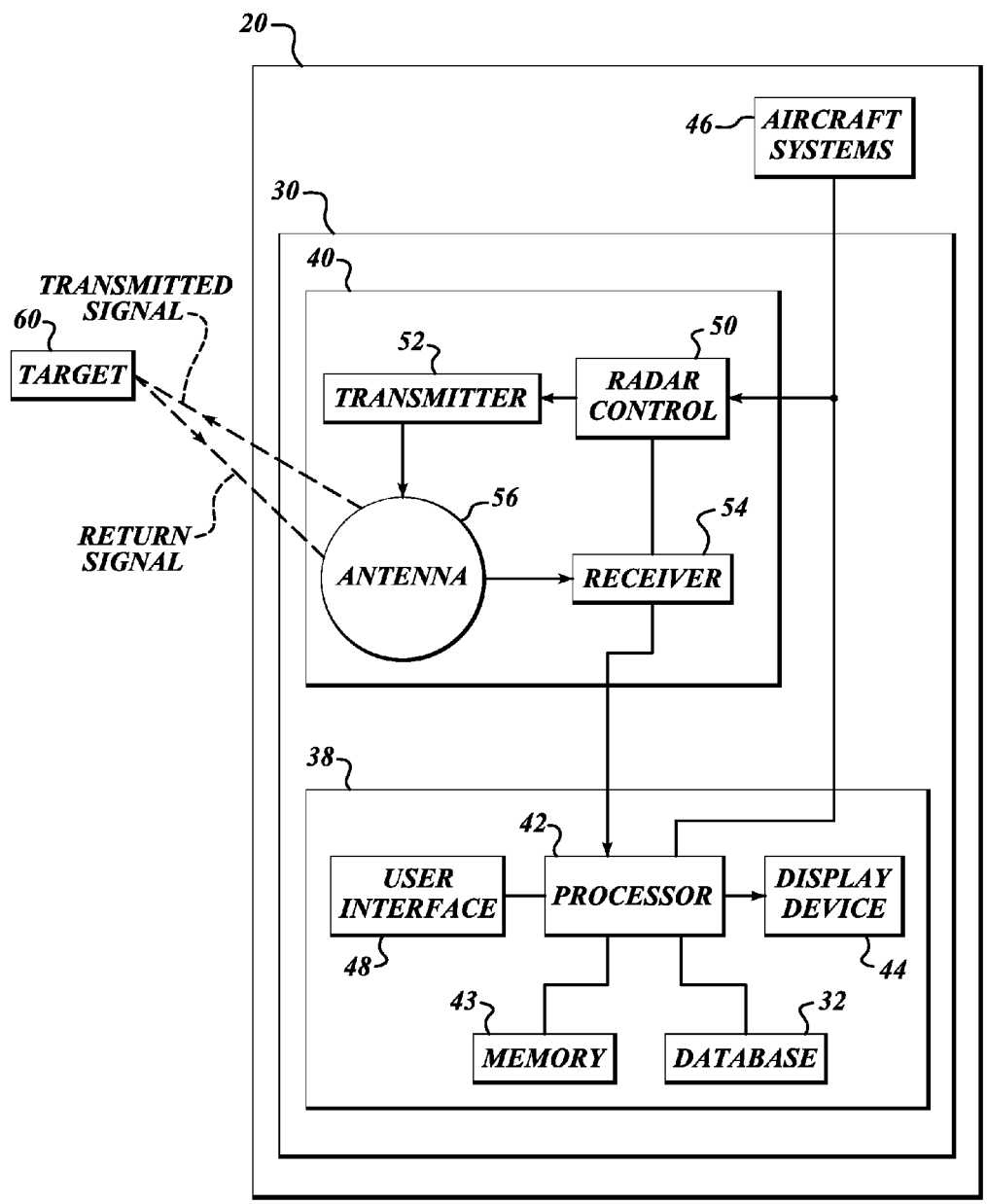
FIG. 1 is a schematic block diagram of a system formed in accordance with an embodiment of the present invention.

FIG. 1 illustrates an aircraft 20 that includes a weather display system 30 for providing an improved radar return. The exemplary weather display system 30 includes a weather radar system 40 and a display/interface front-end 38, and receives information from other aircraft systems 46. The display/interface front-end 38 includes a processor 42, memory 43, a display device 44, a user interface 48, and a database 32. An example of the radar system 40 includes a radar controller 50 (configured to receive control instructions from the user interface 48), a transmitter 52, a receiver 54, and an antenna 56. The radar controller 50 controls the transmitter 52 and the receiver 54 for performing the sending and receiving of signals through the antenna 56. The weather radar system 40 and the display/interface front-end 38 are electronically coupled to the aircraft systems 46.

Radar relies on a transmission of a pulse of electromagnetic energy, referred to herein as a signal. The antenna 56 narrowly focuses the transmission of the signal pulse. Like the light from a flashlight, this narrow signal illuminates any objects in its path and illuminated objects reflect the electromagnetic energy back to the antenna.

Reflectivity data corresponds to that portion of a radar's signal reflected back to the radar by liquids (e.g., rain) and/or frozen droplets (e.g., hail, sleet, and/or snow) residing in a weather object, such as a cloud or storm, or residing in areas proximate to the cloud or storm generating the liquids and/or frozen droplets.

The radar controller 50 calculates the distance of the weather object relative to the antenna based upon the length of time the transmitted signal pulse takes in the transition from the antenna to the object and back to the antenna 56. The relationship between distance and time is linear as the velocity of the signal is constant, approximately the speed of light in a vacuum.

The present invention uses the system 30 to obtain the three-dimensional distribution of radar reflectivity of weather using an airborne radar, perform integrations of the reflectivity in vertical columns, and evaluate the integrations. The result provides a degree of turbulence hazard information to the aircraft. Because of the nature of radar detection of weather, the present invention also identifies areas above and below the analyzed column that might present a turbulence risk. A top of the convective storm might actually be above the detected top because the reflectivity might drop below what can be detected by the radar at that range. Because of this, one embodiment allows for some margin above and below the column to account for the possibility that the hazard extends somewhat beyond the detected column because of radar limitations.

The present invention uses a radar system capable of measurement of the three-dimensional distribution of weather reflectivity from which vertical integrations of reflectivity can be performed. An example radar system capable of measurement of the three-dimensional distribution of weather reflectivity is the IntuVue™ made by Honeywell International, Inc.

Figure 2:
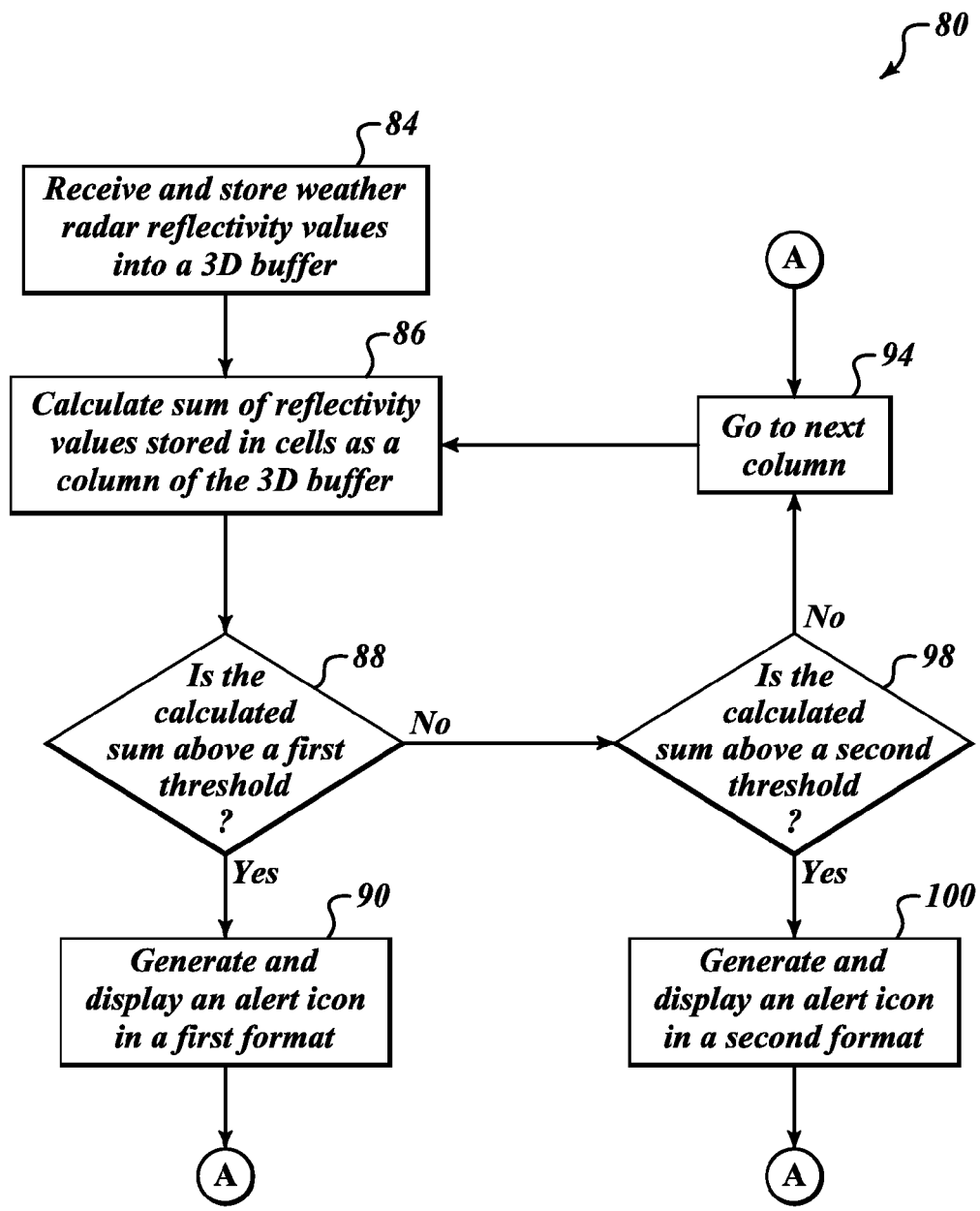
FIG. 2 is a flowchart of an exemplary process performed by the system shown in FIG. 1.

FIG. 2 is a flowchart of an exemplary process 80 performed by the system 30. First, at a block 84, radar reflectivity values are received and stored by the processor 42 into a three-dimensional buffer located in the memory 43. Next, at a block 86, the sum of reflectivity values stored in a column of cells in the three-dimensional buffer is calculated. In another embodiment, an integration of the values in the column is performed. The system 30 vertically integrates the product of reflectivity values and altitude, each raised to some power.

In one embodiment, an approximation of that integral is performed by $$\sum_{i=1}^{N} Z_i^a h_i^b \Delta h$$

where $Z_i$ is the reflectivity of the i-th cell in the column, $h_i$, is the altitude of the i-th cell in the column, N is the number of cells in the column in the 3D buffer, and $\Delta h$ is the vertical size of the buffer cell. If $a=1$ and $b=0$ are used as the power values, then this is just a straight vertical integration of reflectivity (i.e., VIR). To compute vertically integrated liquid (VIL), which is a quantity that has been generated in the past using ground-based radar data, $b=0$, $a=4/7$ are used, and the result is multiplied by a factor of 3.44e-6. This factor and the $4/7$ exponent are taken from a power law relationship between weather reflectivity and liquid water content (LWC), which has units of kg/m³.

In another embodiment, a=4/7, b=1 are used as the power values. This turns the result into something like a potential energy. Potential energy of a mass (m) lofted to a height (h) is given by PE=mgh, where g is the gravitational acceleration. So if the reflectivity is converted to LWC (which is a mass-like quantity), times an altitude, the result is proportional to the energy that the vertical motion has expended to loft the water up into the atmosphere. More energetic vertical motion is expected to generate more energetic turbulence.

At a decision block 88, the processor 42 determines whether the result of the action performed at the block 86 is above a first threshold. If the result is above the first threshold, a hazard icon in a first format is generated and displayed on the display device 44, see block 90. After block 90, the process 80 goes to a next column for analysis, see blocks 94, 86. If the result is not above the first threshold, the processor 42 determines whether the result is above a second threshold, see decision block 98. The actions after the decision block 98 are similar to those after the decision block 88, except a hazard icon in a second format is outputted if the second threshold is exceeded.

In one embodiment, the first and second formats indicate whether the hazard is a "moderate risk" (e.g., amber) or a "high risk" (e.g., magenta) hazard. Other hazard indications (color, geometric) may be used as well as more than two types of hazards.

Figure 3:
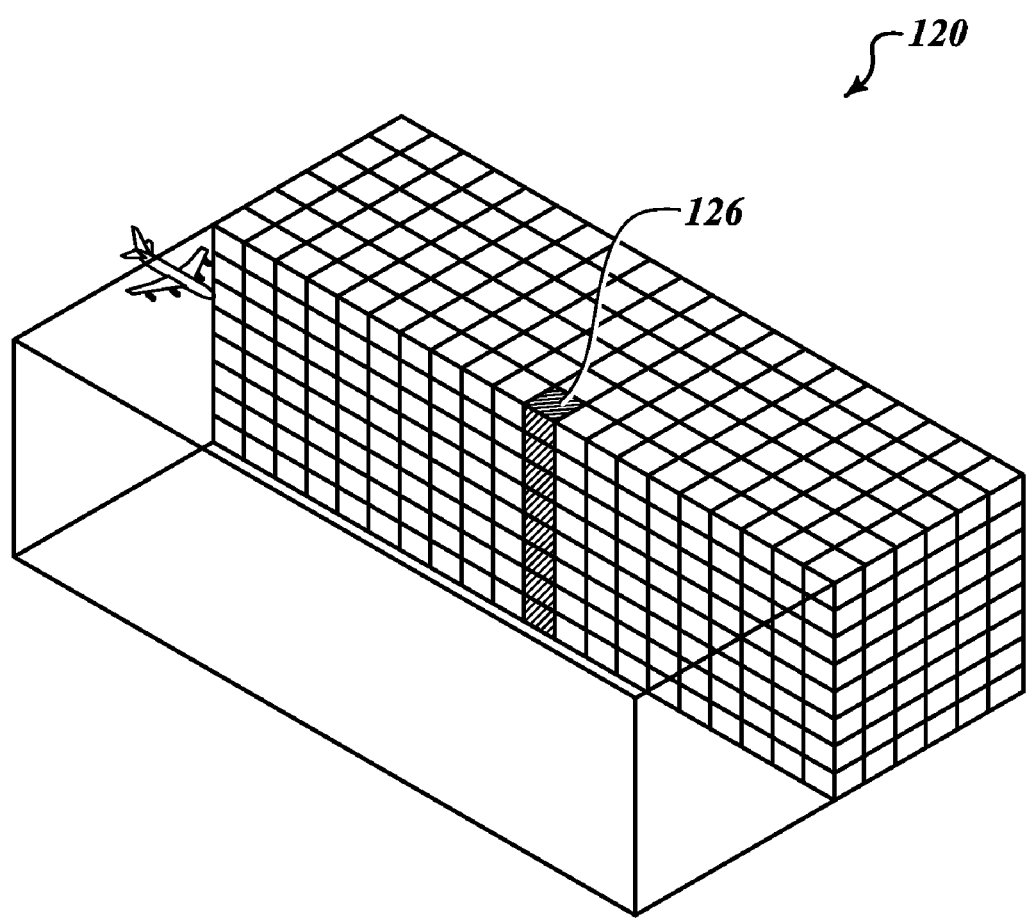
FIG. 3 is a conceptual perspective view of a portion of a three-dimensional buffer used by the system shown in FIG. 1.

FIG. 3 is a conceptual perspective view of a portion of the three-dimensional buffer 120. The buffer 120 includes a column 126 of cells that have been analyzed, as described above, and determined to be greater than the first threshold. The cells in the column 126 are associated with a corresponding hazard indicator. When any of the cells of the column 126 are selected for display, a hazard icon associated with the hazard indicator is displayed based on the cell location on the display device 44.

In one embodiment, the three-dimensional buffer is replaced with a conventional buffer for storing values from various radar sweeps at a particular latitude/longitude location or just adding a value from a radar sweep at a particular latitude/longitude location to a previous summation of values at that location.

While the preferred embodiment of the invention has been illustrated and described, as noted above, many changes can be made without departing from the spirit and scope of the invention. For example, the reflectivity values can be obtained from off-aircraft sources (e.g., other aircraft, ground weather systems, etc.) Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
    at a processing device
       a) receiving weather reflectivity values;
       b) generating a value based on received reflectivity values and an associated latitude/longitude position; and
       c) assigning a first hazard indication to the reflectivity values at a latitude/longitude position when the generated value is above a first threshold; and
    at a display device coupled to the processing device
       d) displaying a first hazard indication when a weather display is being generated that includes a reflectivity value with an assigned first hazard indication,
    wherein receiving comprises storing the weather reflectivity values in cells of a three-dimensional buffer, wherein generating the value comprises calculating a sum of reflectivity values in a column of cells in the three-dimensional buffer.

2. The method of claim 1, further comprising repeating a-d) for other columns within the three-dimensional buffer.

3. The method of claim 1, further comprising assigning at the processing device a second hazard indication to the cells of the column when the result of the calculation is above a second threshold.

4. The method of claim 3, wherein the second threshold is a moderate risk threshold.

5. The method of claim 1, wherein the first threshold is a high risk threshold.

6. The method of claim 1, wherein generating a value comprises:
    taking the product each reflectivity value, an associated altitude component; and
    integrating the product for all the cells of a column in the three-dimension buffer,
    wherein the reflectivity values, an associated altitude component are raised to a predefined power.

7. A system comprising:
    a weather radar system configured to receive weather reflectivity values;
    a processing device configured to generate a value based on received reflectivity values and an associated latitude/longitude position, and assign a first hazard indication to the reflectivity values at a latitude/longitude position when the generated value is above a first threshold; and
    a display device configured to generate a first hazard indication when a weather display is being generated that includes a reflectivity value with an assigned first hazard indication,
    wherein the processing device stores the weather reflectivity values in cells of a three-dimensional buffer, and generates the value by calculating a sum of reflectivity values in a column of cells in the three-dimensional buffer.

8. The system of claim 7, wherein the processing device further assigns a second hazard indication to the cells of the column when the result of the calculation is above a second threshold.

9. The system of claim 8, wherein the second threshold is a moderate risk threshold.

10. The system of claim 7, wherein the first threshold is a high risk threshold.

11. The system of claim 7, wherein the processing device generates the value by integrating the stored reflectivity values in the column.

12. The system of claim 11, wherein the processing device generates the value by taking the product each reflectivity value, an associated altitude component and integrating the product for all the cells of a column in the three-dimension buffer, wherein the reflectivity value, an associated altitude component are raised to a predefined power.

13. A system comprising:
    a first means for receiving weather reflectivity values into a three-dimensional buffer;
    a second means for generating a value associated with the reflectivity values stored in a column of cells within the three-dimensional buffer and altitude associated with the cells;
    a third means for assigning a first hazard indication to the cells of the column when the result of the calculation is above a first threshold; and a fourth means for displaying a display icon associated with the first hazard indication when a weather display is being generated that includes a cell having an assigned hazard indication.

14. The system of claim 13, wherein the first-fourth means repeat for other columns within the three-dimensional buffer.

15. The system of claim 13, further comprising a fifth means for assigning a second hazard indication to the cells of the column when the result of the calculation is above a second threshold.

16. The system of claim 15, wherein the second threshold is a moderate risk threshold.

17. The system of claim 13, wherein the first threshold is a high risk threshold.

* * * * *